United States Patent
Cho

(10) Patent No.: US 9,490,890 B2
(45) Date of Patent: Nov. 8, 2016

(54) BASE STATION SIGNAL MATCHING DEVICE FOR DISTRIBUTED ANTENNA SYSTEM

(71) Applicant: SOLiD, INC., Seongnam-si, Gyeonggi-do (KR)

(72) Inventor: Yongki Cho, Yongin-si (KR)

(73) Assignee: SOLID, INC., Seongnam-si (KR)

( * ) Notice: Subject to any disclaimer, the term of this patent is extended or adjusted under 35 U.S.C. 154(b) by 0 days.

(21) Appl. No.: 15/079,687

(22) Filed: Mar. 24, 2016

(65) Prior Publication Data

US 2016/0204848 A1    Jul. 14, 2016

Related U.S. Application Data

(63) Continuation-in-part of application No. PCT/KR2014/013106, filed on Dec. 31, 2014.

(30) Foreign Application Priority Data

Dec. 30, 2014  (KR) .......................... 10-2014-0194376

(51) Int. Cl.
| | | |
|---|---|---|
| H04B 7/00 | (2006.01) | |
| H04B 7/155 | (2006.01) | |
| H04B 7/04 | (2006.01) | |

(52) U.S. Cl.
CPC ............ *H04B 7/15507* (2013.01); *H04B 7/04* (2013.01)

(58) Field of Classification Search
None
See application file for complete search history.

(56) References Cited

U.S. PATENT DOCUMENTS

| | | | | |
|---|---|---|---|---|
| 8,588,614 | B2* | 11/2013 | Larsen ............. | H04B 10/25754 398/115 |
| 2007/0147525 | A1* | 6/2007 | Song ................. | H04L 27/2647 375/260 |
| 2009/0061921 | A1* | 3/2009 | Eom ................. | H04W 52/42 455/522 |
| 2011/0165852 | A1* | 7/2011 | Furukawa ......... | H04W 28/0236 455/226.2 |
| 2012/0314797 | A1 | 12/2012 | Kummetz et al. | |
| 2013/0195467 | A1 | 8/2013 | Schmid et al. | |
| 2014/0022914 | A1 | 1/2014 | Leimeister et al. | |
| 2014/0050483 | A1 | 2/2014 | Berlin et al. | |
| 2014/0269318 | A1* | 9/2014 | Hasarchi .......... | H04B 7/024 370/235 |
| 2014/0342674 | A1 | 11/2014 | Melester et al. | |
| 2015/0087329 | A1* | 3/2015 | Stratford .......... | H04W 64/00 455/456.1 |

FOREIGN PATENT DOCUMENTS

| | | |
|---|---|---|
| KR | 10-2013-0099984 A | 9/2013 |
| KR | 10-2014-0033176 A | 3/2014 |

OTHER PUBLICATIONS

International Search Report of PCT/KR2014/013106 dated Sep. 25, 2015.

* cited by examiner

*Primary Examiner* — Dominic Rego
(74) *Attorney, Agent, or Firm* — Sughrue Mion, PLLC

(57) ABSTRACT

A base station signal matching device is a base station signal matching device mounted in a distributed antenna system for amplifying a received base station signal and transmitting the amplified base station signal to a user terminal. The base station signal matching device includes a first unit for generating first and second branch base station signals by using a power division function based on the base station signal, and transmitting the second branch base station signal to a third unit, and a second unit for matching the first branch base station signal to be suitable for signal processing of the distributed antenna system.

13 Claims, 4 Drawing Sheets

BASE STATION SIGNAL MATCHING DEVICE FOR DISTRIBUTED ANTENNA SYSTEM

CROSS REFERENCE TO RELATED APPLICATIONS

This application is a Continuation-in-Part of International Application No. PCT/KR2014/013106, filed Dec. 31, 2014, and claims priority from Korean Patent Application No. 10-2014-0194376 filed Dec. 30, 2014, the contents of which are incorporated herein by reference in their entireties.

BACKGROUND

1. Field

The inventive concept relates to a base station signal matching device, and more particularly, to a base station signal matching device for matching a base station signal transmitted from a base station to be suitable for a distributed antenna system.

2. Description of Related Art

A distributed antenna system is an example of a relay system for relaying communication between base station and user terminals. The distributed antenna system is used in terms of service coverage extension of base station so as to provide mobile communication services to even shaded areas necessarily generated indoors or outdoors.

The distributed antenna system, based on a downlink path, receives a base station signal transmitted from a base station to perform signal processing, such as amplification, on the base station signal, and then transmits the signal-processed base station signal to a user terminal in a service area. Also, the distributed antenna system, based on an uplink path, performs signal processing, such as amplification, on a terminal signal transmitted from the user terminal and then transmits the signal-processed terminal signal to the base station. The matching of signals transmitted/received between base stations and the distributed antenna system is essential to implement such a relay function. Conventionally, external base station signal matching devices were used.

A conventional external base station signal matching device includes passive elements including an attenuator for adjusting the power of a base station signal to convert the base station signal having a high power level into an appropriate power level required in the distributed antenna system, a filter for dividing a duplexer type base station signal transmitted from a base station into a downlink and an uplink, and the like. The passive elements are very high-priced, and have large sizes. Therefore, it is difficult to miniaturize the passive elements.

Also, the attenuator is used in the conventional external base station matching device is a high-power attenuator capable of adjusting high power of base stations, but passive intermodulation characteristics of the attenuator are not satisfactory. Therefore, when a high-power base station signal is input to the distributed antenna system via the high-power attenuator on a downlink path, a passive intermodulation distortion (PIMD) signal is generated, and a spurious signal is caused as the generated PIMD signal is input through an uplink path. In addition, a large amount of heat is generated in attenuation of the high-power attenuator. Therefore, the base station signal matching device is damaged, and the lifespan of the base station signal matching device is shortened.

SUMMARY

An embodiment of the inventive concept is directed to a base station signal matching device which can be mounted in a base station interface unit, etc. of a distributed antenna system, so that it is possible to reduce manufacturing cost of the distributed antenna system, minimize the influence of a passive intermodulation distortion signal, and prevent the generation of heat.

According to an aspect of the inventive concept, there is provided a base station signal matching device included in a distributed antenna system for amplifying a received base station signal and transmitting the amplified base station signal to a user terminal, the base station signal matching device including: a first unit configured to generate first and second branch base station signals by using a power division function based on the received base station signal, and transmit the second branch base station signal to a third unit; and a second unit configured to match the first branch base station signal to be suitable for signal processing of the distributed antenna system.

According to an exemplary embodiment, the first unit may include a coupler configured to generate the first and second branch base station signals by using the power division function through separating the received base station signal. Herein, a power ratio of the first and second branch base station signals may be corresponding to a coupling ratio of the coupler.

According to an exemplary embodiment, the coupling ratio of the coupler may be variable.

According to an exemplary embodiment, a power level of the first branch base station signal may be lower than a power level of the second branch base station signal.

According to an exemplary embodiment, the second unit may include a first filter configured to receive the first branch base station signal, and have a pass band corresponding to a service frequency band of the first branch base station signal; and a first variable attenuator configured to adjust power of the first branch base station signal such that the first branch base station signal passing through the first filter has a power level suitable for signal processing of the distributed antenna system.

According to an exemplary embodiment, the second unit may further include a first power detector configured to detect a power level of the first branch base station signal passing through the first filter.

According to an exemplary embodiment, the second unit may further include a test signal generator configured to generate a test signal for determining whether the distributed antenna system normally operates.

According to an exemplary embodiment, the distributed antenna system may amplify a received user terminal signal and transmit the amplified user terminal signal to a base station. The second unit may include a second variable attenuator configured to adjust power of the user terminal signal such that the user terminal signal has a power level suitable for signal processing of the base station; and a second filter configured to have a pass band corresponding to a service frequency band of the user terminal signal of which power is adjusted by the second variable attenuator.

According to an exemplary embodiment, the second unit may further include a second power detector configured to detect a power level of the user terminal signal of which power is adjusted by the second variable attenuator.

According to an exemplary embodiment, the third unit may terminate the second branch base station signal to a ground through an attenuator or isolator.

According to an exemplary embodiment, the third unit may include a means for removing heat generated in the termination of the second branch base station signal.

According to an exemplary embodiment, the third unit may be modularized separately from the first unit and the second unit.

According to another aspect of the inventive concept, there is provided a base station interface unit constituting a distributed antenna system for amplifying a received base station signal and transmitting the amplified base station signal to a user terminal and comprising a base station signal matching device as stated above.

According to embodiments of the inventive concept, the base station signal matching device is mounted t in the base station interface unit of the distributed antenna system, so that the manufacturing cost of the distributed antenna system can be reduced without requiring a separate external device for signal matching with base stations.

Also, the base station signal matching device performs signal processing for matching, based on a low-power signal branched from a base station signal, and, separately from the low-power signal, terminates a high-power signal by using a high-power attenuator, so that it is possible to improve passive intermodulation characteristics and prevent damage of the device and reduction in lifespan of the device.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
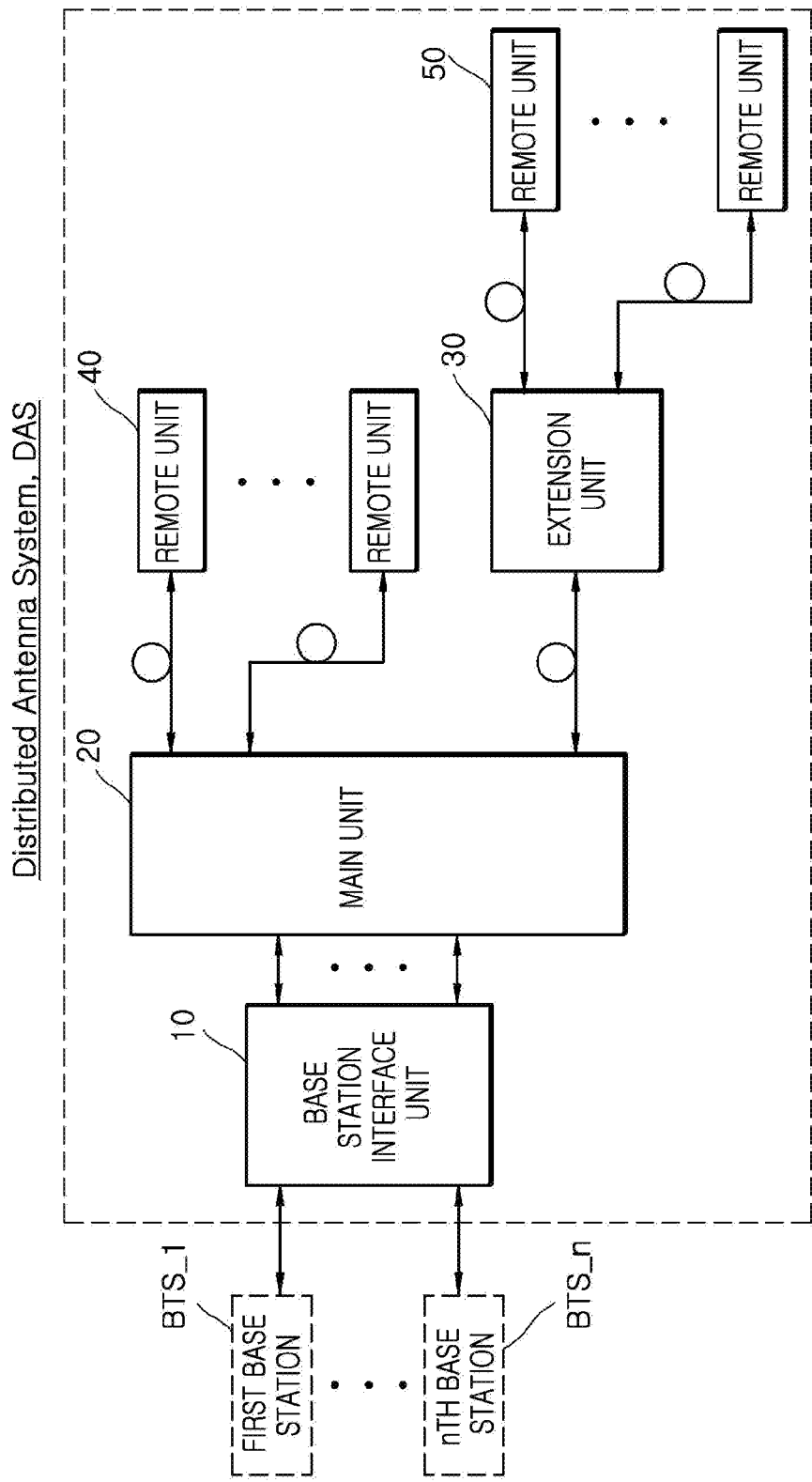
FIG. 1 is a block diagram schematically showing a topology of a distributed antenna system to which a base station signal matching device is to be applied according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

It is noted that the components of the inventive concept are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

Hereinafter, embodiments of the inventive concept will be described in detail with reference to the accompanying drawings.

FIG. 1 is a block diagram schematically showing a topology of a distributed antenna system to which a base station signal matching device is to be applied according to an embodiment of the inventive concept.

Referring to FIG. 1, the distributed antenna system DAS amplifies a base station signal and then transmits the amplified base station signal to a user terminal (not shown), and amplifies a user terminal signal and then transmits the amplified user terminal signal to a base station, thereby implementing a relay function. In order to implement the relay function, the distributed antenna system DAS may include a base station interface unit 10 and a main unit 20, which constitute a headend node, an extension unit 30 that is an extension node, and a plurality of remote units 40 and 50 respectively disposed at remote service locations. The distributed antenna system DAS may be implemented as an analog distributed antenna system or a digital distributed antenna system. When necessary, the distributed antenna system DAS may be implemented as a hybrid of the analog distributed antenna system and the digital distributed antenna system (i.e., performance of analog processing on some nodes and digital processing on the other nodes).

However, FIG. 1 illustrates an example of the topology of the distributed antenna system DAS, and the distributed antenna system DAS may have various topologies in consideration of particularity of its installation area and application field (e.g., in-building, subway, hospital, stadium, etc.). As such, the number of the base station interface unit 10, the main unit 20, the extension unit 30, and the remote units 40 and 50 and upper/lower end connection relations between the base station interface unit 10, the main unit 20, the extension unit 30, and the remote units 40 and 50 may also be different from those of FIG. 1. In the distributed antenna system DAS, the extension unit 30 is used when the number of branches to be branched in a star structure from the main unit 20 is limited as compared with the number of remote units required to be installed. Therefore, the extension unit 30 may be omitted when only the single main unit 20 sufficiently covers the number of remote units 40 and 50 required to be installed, when a plurality of main units 20 are installed, or the like.

Each node and its function in the distributed antenna system DAS will be described in detail. First, the base interface unit 10 may perform an interface function between a base station and the main unit 20 in the distributed antenna system DAS. In FIG. 1, it is illustrated that a plurality of base stations (first to nth base stations) (n is a natural number of 2 or more) are connected to the single base station interface unit 10. However, the base station interface unit 10 may be separately provided for each provider, each frequency band, or each sector.

In general, a radio frequency (RF) signal transmitted to a base station is a signal of high power. Therefore, the base station interface unit 10 may convert the RF signal of high power into a signal of power suitable to be processed in the main unit 20, and perform a function of transmitting the power-adjusted RF signal to the main unit 20.

As shown in FIG. 1, when the base station interface unit 10 decreases high power of an RF signal for each frequency band (or each provider or each sector) to low power and then transmits, in parallel, the RF signals of low power to the main unit 20, the main unit 20 may perform a function of combining the low-power RF signals and distributing the combined signal to the remote units 40 and 50. In this case, when the distributed antenna system DAS is implemented as the digital distributed antenna system, the base station interface unit 10 may digitize low-power RF signals and transmit, in parallel, the digitized low-power RF signals to the main unit 10. The main unit 20 may combine the digitized low-power RF signals, perform predetermined signal processing on the combined signal, and then distribute the signal-processed signal to the remote units 40 and 50. Alternatively, the main unit 20 may digitize low-power RF signals transmitted from the base station interface unit 10, combine the digitized low-power RF signals, perform predetermined signal processing on the combined signal, and then distribute the signal-processed signal to the remote units 40 and 50.

According to an implementation method, the base station interface unit 10, unlike as shown in FIG. 1, may combine an RF signal for each frequency band (or each provider or each sector) and then transmit the combined signal to the main unit 20. The main unit 20 may perform a function of distributing the combined signal to the remote units 40 and 50. In this case, when the distributed antenna system DAS is implemented as the digital distributed antenna system, the base station interface unit 10 may be separated into a unit for performing a function of converting a high-power RF signal into a low-power RF signal, a unit for converting a low-power RF signal into an intermediate frequency (IF) signal, performing digital signal processing on the converted IF signal, and then combining the digital signal processed signal, and the like. Alternatively, when the distributed antenna system DAS is implemented as the analog distributed antenna system, the base station interface unit 10 may be separated into a unit for performing a function of decreasing high power of an RF signal to low power and a unit for combining a low power RF signal.

The base station signal matching device according to the embodiment of the inventive concept is mounted in the base station interface unit 10, to adjust the power level of a high-power RF signal transmitted from a base station. The base station signal matching device according to the embodiment of the inventive concept may be provided for each frequency band (or each provider or each sector) in the base station interface unit 10. This will be described in detail below with reference to FIGS. 2 to 4.

Each of the remote units 40 and 50 may separate the combined signal transmitted from the main unit 20 for each frequency band and perform signal processing (analog signal processing in the analog DAS and digital signal processing in the digital DAS) such as amplification. Accordingly, each of the remote units 40 and 50 can a base station signal to a user terminal in its own service coverage through a service antenna (not shown).

Meanwhile, in FIG. 1, it is illustrated that a base station BTS and the base station interface unit 10 are connected to each other through an RF cable, the base station interface unit 10 and the main unit 10 are connected to each other through an RF cable, and all units from the main unit 20 to a lower end thereof are connected to each other through optical cables. However, a signal transport medium between nodes may be variously modified.

As an example, the base station interface unit 10 and the main unit 20 may be connected through an RF cable, but connected through an optical cable or a digital interface. As another example, at least one of connection between the main unit 20 and the extension unit 30, connection between the main unit 20 and the remote unit 40 and connection between the extension unit 30 and the remote unit 50 may be implemented through an RF cable, a twist cable, a UTP cable, etc., as well as the optical cable.

Hereinafter, this will be described based on FIG. 1. Therefore, in this embodiment, the main unit 20, the extension unit 30, and the remote units 40 and 50 may include an optical transceiver module for transmitting/receiving optical signals through electro-optic conversion/photoelectric conversion. When connection between nodes is implemented through a single optical cable, the main unit 20, the extension unit 30, and the remote units 40 and 50 may include a wavelength division multiplexing (WDM) element.

The distributed antenna system DAS may be connected, through a network, an external management device (not shown), e.g., a network management server or system (NMS). Accordingly, a manager can remotely monitor a status and problem of each node in the distributed antenna system and remotely control an operation of each node through the NMS.

Figure 2:
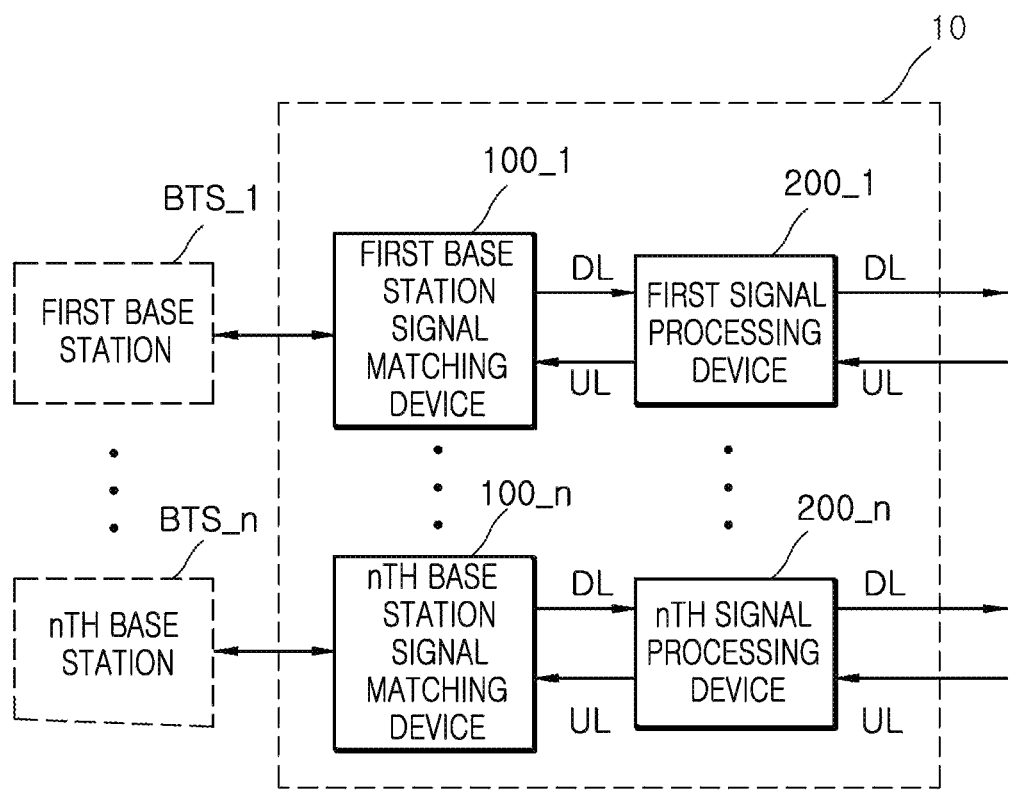
FIG. 2 is a block diagram schematically showing some components of a base station interface unit shown in FIG. 1.

FIG. 2 is a block diagram schematically showing some components of the base station interface unit shown in FIG. 1.

Referring to FIG. 2, the base station interface unit 10 may include first to nth base station signal matching devices 100_1 to 100_n each coupled to a corresponding base station among first to nth base stations BTS_1 to BTS_n, and first to nth signal processing devices 200_1 to 200_n each coupled to a corresponding base station signal matching device among the first to nth base station signal matching devices 100_1 to 100_n. In FIG. 2, it is illustrated that the first to nth signal processing devices 200_1 to 200_n transmit base station signals having service frequency bands distinguished from each other, and the first to nth base station signal matching devices 100_1 to 100_n and the first to nth signal processing devices 200_1 to 200_n are provided in the base station interface unit 10, corresponding to the respective first to nth base stations BTS_1 to BTS_n. However, it will be apparent that, as described above, the first to nth base station signal matching devices 100_1 to 100_n and the first to nth signal processing devices 200_1 to 200_n may be provided in the base station interface unit 10 for each sector or each provider.

Each of the first to nth base station signal matching devices 100_1 to 100_n, based on a downlink path, may receive a base station signal input from a corresponding base station. The base station signal may be an RF type signal and have high power. Each of the first to nth base station signal matching devices 100_1 to 100_n may adjust the power level of the corresponding base station signal to be suitable for the power level required in the distributed antenna system (more specifically, a signal processing device, a main unit, etc., connected to a rear end of the base station signal matching device), and transmit the base station signal of which power level is adjusted to a corresponding signal processing device.

Each of the first to nth signal processing devices 200_1 to 200_n, based on a downlink path, may perform signal processing, such as amplification, on the transmitted base station signal, and then transmit the signal-processed base station signal to the main unit 20 (see FIG. 1). In this case, when the distributed antenna system is configured as the digital distributed antenna system, the first to nth signal processing devices 200_1 to 200_n may digitize RF type base station signals subjected to signal processing such as amplification and transmit the digitized base station signals to the main unit 20 (see FIG. 1).

Meanwhile, although not shown in FIG. 2, the base station interface unit 10 may further include a combining/distributing unit. The combining/distributing unit may combine output signals of the first to nth signal processing devices 200_1 to 200_n and transmit the combined signal to the main unit 20 (see FIG. 1).

Each of the first to nth signal processing devices 200_1 to 200_n, based on an uplink path, may perform signal processing, such as amplification, on a user terminal signal which is transmitted from the main unit 20 (see FIG. 1) and has a corresponding service frequency, and then transmit the signal-processed user terminal signal to a corresponding base station signal matching device. In this case, when the distributed antenna system is configured as the digital distributed antenna system, each of the first to nth signal processing devices 200_1 to 200_n may convert a digital type user terminal signal into an analog type signal, perform signal processing, such as amplification, on the converted analog type signal, and then transmit the signal-processed signal to the corresponding base station signal matching device.

Meanwhile, although not shown in FIG. 2, when the base station interface unit 10 includes the above-described combining/distributing unit, the combining/distributing unit may separate, for each service frequency band, a signal which is transmitted from the main unit 20 (see FIG. 1) and obtained by combining user terminal signals, and transmit the separated user terminal signals to the respective corresponding signal processing devices.

Each of the first to nth base station signal matching devices 100_1 to 100_n, based on an uplink path, may adjust the transmitted user terminal signal to be suitable for the power level required in the corresponding base station and transmit the adjusted user terminal signal to the base station.

Figure 3:
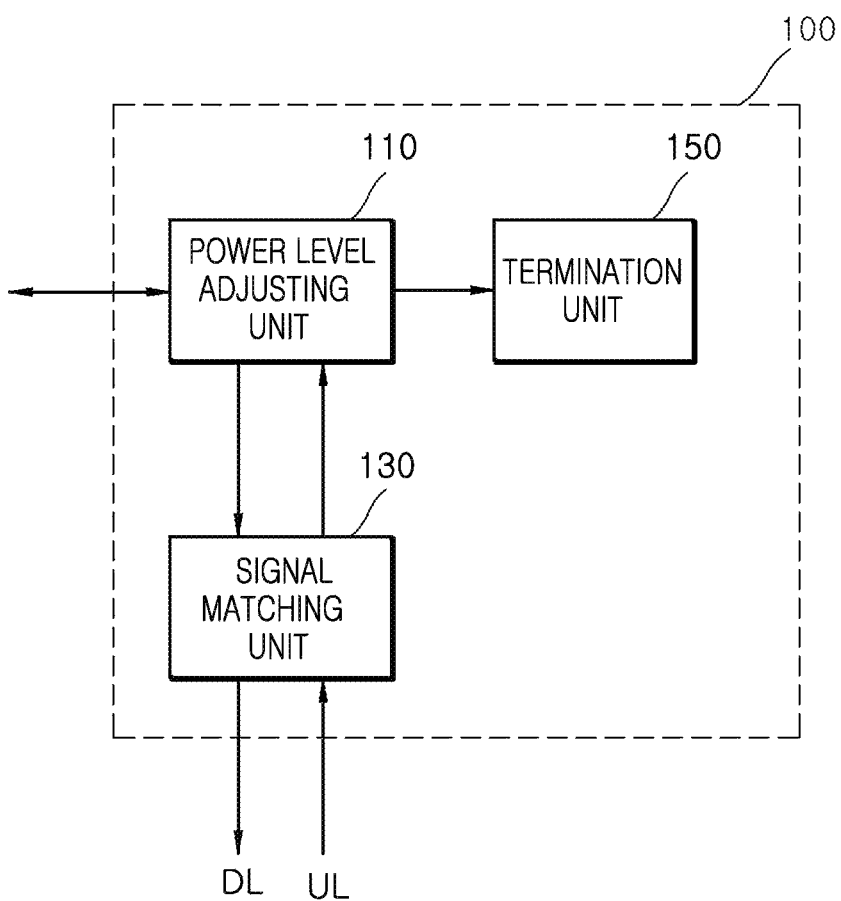
FIG. 3 is a block diagram schematically showing some components of a base station signal matching device shown in FIG. 2.
Figure 4:
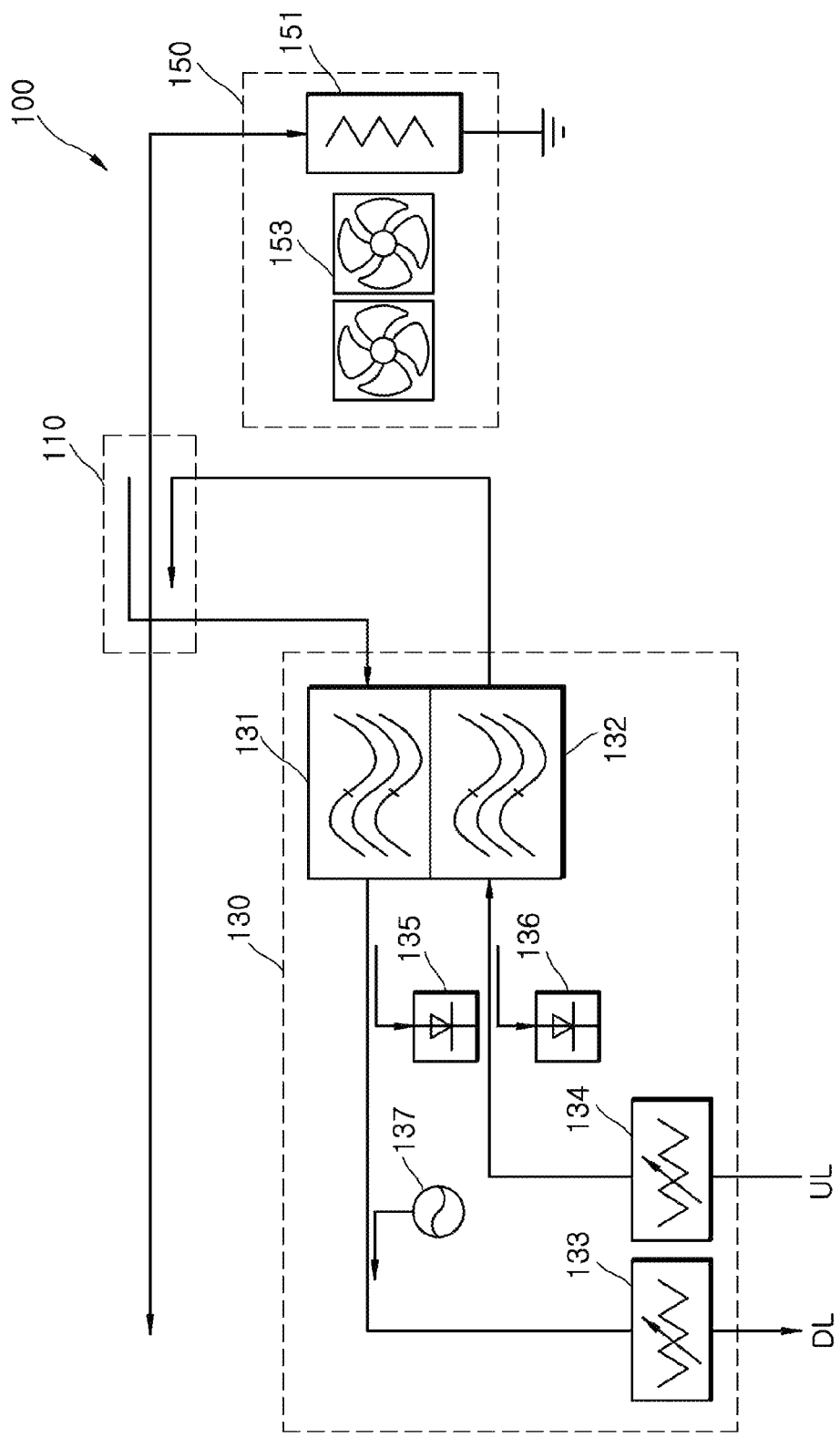
FIG. 4 is a diagram showing in detail the base station signal matching device shown in FIG. 3.

FIG. 3 is a block diagram schematically showing some components of a base station signal matching device shown in FIG. 2. FIG. 4 is a diagram showing in detail the base station signal matching device shown in FIG. 3. The base station signal matching device shown in FIGS. 3 and 4 may be any one of the first to nth base station signal matching devices 100_1 to 100_n shown in FIG. 2. Hereinafter, for convenience of illustration, the base station signal matching device will be described with reference to FIGS. 3 and 4 together with FIG. 2, and descriptions overlapping with FIG. 2 will be omitted.

Referring to FIGS. 2 to 4, the base station signal matching device 100 may include a power level adjusting unit 110, a signal matching unit 130, and a termination unit 150.

The power level adjusting unit 110, based on a downlink path, may generate first and second branch base station signals of which power levels are adjusted based on an input base station signal. The power level adjusting unit 110, for example, may include a coupler, and generate the first and second branch base station signals of which power levels are adjusted by using a power division function as the input signal is separated by the coupler. The power ratio the of first and second branch base station signals may correspond to a coupling ratio of the coupler. The coupling ratio of the coupler may be varied depending on power levels required in the first and second branch base station signals.

The power level adjusting unit 110, based on a downlink path, may transmit the first branch base station signal to the signal matching unit 130 and transmit the second branch base station signal to the termination unit 150. Here, the power level of the first branch base station signal may be lower than that of the second branch base station signal.

The power level adjusting unit 110, based on the uplink path, may perform coupling on a user terminal signal transmitted from the signal matching unit 130 and transmit the coupled user terminal signal to the base station BTS (see FIG. 1).

The signal matching unit 130, based on the downlink path, may receive the first branch base station signal that have a relatively low power as compared with the second branch base station signal, and match the first branch base station signal to be suitable for signal processing of the distributed antenna system. For example, the signal matching unit 130 may match the first branch base station signal in a manner that adjusts the power level of the first branch base station signal to be suitable for signal processing in the signal processing device 200, the main unit 20 (see FIG. 1), etc., connected to the rear end of the base station signal matching device 100.

The signal matching unit 130, based on the downlink path, may include a first filter 131 and a variable attenuator 133. The first filter 131 may receive the first branch base station signal. In this case, the first filter 131 may have a pass band corresponding to the service frequency band of the first branch base station signal. Meanwhile, the first filter 131 may be implemented, as one duplexer, together with the following second filter 132. The first variable attenuator 133 may adjust the power of the first branch base station signal passing through the first filter 131 to have power of a level suitable for signal processing of the signal processing device 200, etc.

The signal matching unit 130, based on the downlink path, may further include a first power detector 135. The first power detector 135 may detect the power level of the first branch base station signal passing through the first filter 131. Accordingly, the power level of the first branch base station signal can be monitored on the downlink path, and a manager can check (or identify) a status of the base station signal matching device 100 at an installation spot of the base station signal matching device 100 or a remote place through the NMS, based on the monitored power level. Meanwhile, according to an implementation example, the first power detector 135 may detect the power level of the first branch base station signal of which power level is adjusted by the first variable attenuator 133 at the rear end of the first variable attenuator 133.

The signal matching unit 130, based on the downlink path, may further include a test signal generator 137. When the distributed antenna system having the base station signal matching device 100 mounted therein is initially installed, the test signal generator 137 may generate a test signal for testing the distributed antenna system. The test signal generator 137 may transmit the test signal to the first variable attenuator 133 through the downlink path. The test signal may correspond to the first branch base station signal. In the distributed antenna system having the base station signal matching device 100 mounted therein, the integrity of the distributed antenna system can be identified by diagnosing whether signal processing on the downlink path is abnormal through the test signal.

The signal matching unit 130, based on the uplink path, may match a user terminal signal transmitted from the signal processing device 200 to be suitable for signal processing of the base station. For example, the signal matching unit 130 may match the user terminal signal in a manner that adjusts the power level of the user terminal signal to correspond to the power level required in the base station BTS (see FIG. 2).

The signal matching unit 130, based on the uplink path, may include a second filter 132 and a second variable attenuator 134. First, the second variable attenuator 134 may adjust the power level of a user terminal signal to be suitable for signal processing of the base station. The second filter 132 may receive the user terminal signal of which power level is adjusted by the second variable attenuator 134, and have a pass band corresponding to the service frequency band of the user terminal signal.

The signal matching unit 130, based on the uplink path, may further include a second power detector 136. Accordingly, the power level of the user terminal signal can be monitored on the uplink path, and a manager can check (or identify) a status of the base station signal matching device 100 at an installation spot of the base station signal matching device 100 or a remote place through the NMS, based on the monitored power level.

The termination unit 150, based on the downlink path, may receive the second branch base station signal that has a relatively high power as compared with the first branch base station signal, and terminate the second branch base station signal to a ground. The termination unit 150 may include a termination circuit 151, e.g., a high-power attenuator, an isolator, etc., and may terminate the second branch base station signal to the ground through the termination circuit 151.

The termination unit 150 may further include a means 153 for removing heat generated in the termination of the second branch base station signal (e.g., when the termination circuit 151 is configured as an attenuator to attenuate the second branch base station signal). The means 153 may be configured as a fan.

Meanwhile, according to an implementation example, the termination unit 150 may be modularized separately from the power level adjusting unit 110 and the signal matching unit 130. For example, in the base station signal matching device 100, the termination unit 150 may be modularized to be physically separated from a module including the power level adjusting unit 110 and the signal matching unit 130. According to another implementation example, the termination unit 150 may be physically separated as a separate device from the base station signal matching device 100.

As described above, the base station signal matching device 100 is mounted in the base station interface unit 10 of the distributed antenna system, so that the manufacturing cost of the distributed antenna system can be reduced without requiring a separate external device for signal matching with base stations in the design and manufacturing of the distributed antenna system.

Also, the base station signal matching device 100 separates a base station signal into a low-power first branch base station signal and a high-power second branch base station signal, and terminates the high-power second branch base station signal by using the termination unit separated from a configuration for processing the low-power first branch base station signal, so that it is possible to prevent, in advance, the generation of an unnecessary wave as a passive intermodulation distortion signal is input through the uplink path when a high-power signal is attenuated in the existing base station signal matching device. In addition, the means for removing heat is provided in the termination unit 150, so that it is possible to prevent the generation of heat caused by the attenuation of a high-power signal. Thus, it is possible to maximize the lifespan of the base station signal matching device.

Also, the base station signal matching device 100 can monitor whether the device is abnormal by sensing, in real time, power levels of the downlink path and uplink path in the signal matching unit 130, and determine whether the distributed antenna system is abnormal through a test signal in initial setting. Thus, it is possible to ensure the service reliability of the distributed antenna system.

Meanwhile, in the above, the case where the base station signal matching device according to the embodiment of the inventive concept is mounted in the base station interface unit of the distributed antenna system has been described as an example with reference to FIGS. 1 to 4, but the inventive concept is not limited thereto. It will be apparent that the base station signal matching device according to the embodiment of the inventive concept may be mounted in various communication devices required to interface with other base stations.

While the inventive concept has been described with respect to the specific embodiments, it will be apparent to those skilled in the art that various changes and modifications may be made without departing from the spirit and scope of the inventive concept as defined in the following claims.

What is claimed is:

1. A base station signal matching device included in a distributed antenna system for amplifying a received base station signal and transmitting the amplified base station signal to a user terminal, the base station signal matching device comprising:
　　a first unit configured to generate first and second branch base station signals by using a power division function based on the received base station signal, and transmit the second branch base station signal to a third unit; and
　　a second unit configured to match the first branch base station signal to be suitable for signal processing of the distributed antenna system.

2. The base station signal matching device of claim 1, wherein the first unit includes a coupler configured to generate the first and second branch base station signals by using the power division function through separating the received base station signal,
　　wherein a power ratio of the first and second branch base station signals is corresponding to a coupling ratio of the coupler.

3. The base station signal matching device of claim 2, wherein the coupling ratio of the coupler is variable.

4. The base station signal matching device of claim 1, wherein a power level of the first branch base station signal is lower than a power level of the second branch base station signal.

5. The base station signal matching device of claim 1, wherein the second unit includes:
   a first filter configured to receive the first branch base station signal, and have a pass band corresponding to a service frequency band of the first branch base station signal; and
   a first variable attenuator configured to adjust power of the first branch base station signal such that the first branch base station signal passing through the first filter has a power level suitable for signal processing of the distributed antenna system.

6. The base station signal matching device of claim 5, wherein the second unit further includes a first power detector configured to detect a power level of the first branch base station signal passing through the first filter.

7. The base station signal matching device of claim 5, wherein the second unit further includes a test signal generator configured to generate a test signal for determining whether the distributed antenna system normally operates.

8. The base station signal matching device of claim 1, wherein the distributed antenna system amplifies a received user terminal signal and transmits the amplified user terminal signal to a base station, and
   wherein the second unit includes:
   a second variable attenuator configured to adjust power of the user terminal signal such that the user terminal signal has a power level suitable for signal processing of the base station; and
   a second filter configured to have a pass band corresponding to a service frequency band of the user terminal signal of which power is adjusted by the second variable attenuator.

9. The base station signal matching device of claim 8, wherein the second unit further includes a second power detector configured to detect a power level of the user terminal signal of which power is adjusted by the second variable attenuator.

10. The base station signal matching device of claim 1, wherein the third unit terminates the second branch base station signal to a ground through an attenuator or isolator.

11. The base station signal matching device of claim 10, wherein the third unit includes a means for removing heat generated in the termination of the second branch base station signal.

12. The base station signal matching device of claim 1, wherein the third unit is modularized separately from the first unit and the second unit.

13. A base station interface unit constituting a distributed antenna system for amplifying a received base station signal and transmitting the amplified base station signal to a user terminal, the base station interface unit comprising:
   at least one base station signal matching device, wherein the base station signal matching device including:
   a first unit configured to generate first and second branch base station signals by using a power division function based on the received base station signal, and transmit the second branch base station signal to a third unit; and
   a second unit configured to match the first branch base station signal to be suitable for signal processing of the distributed antenna system.

* * * * *